Aug. 24, 1965 S. A. FINDLEY ETAL 3,202,246
SELECTOR ASSEMBLY FLOOR SHIFT WITH CLUTCH CONTROL
Filed May 22, 1963 2 Sheets-Sheet 1
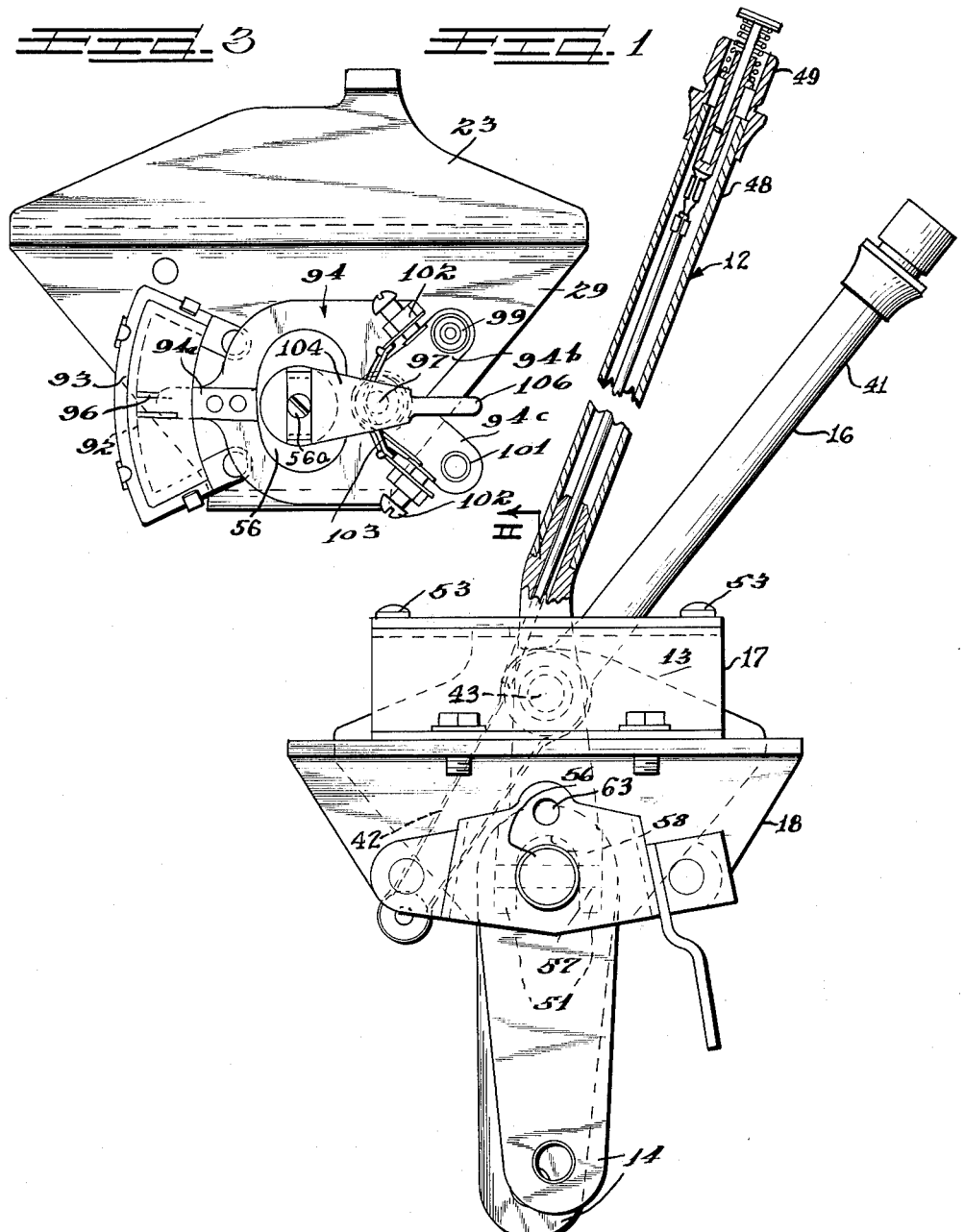
INVENTOR.
Samuel A. Findley
Frank C. Rieger
ATTORNEYS

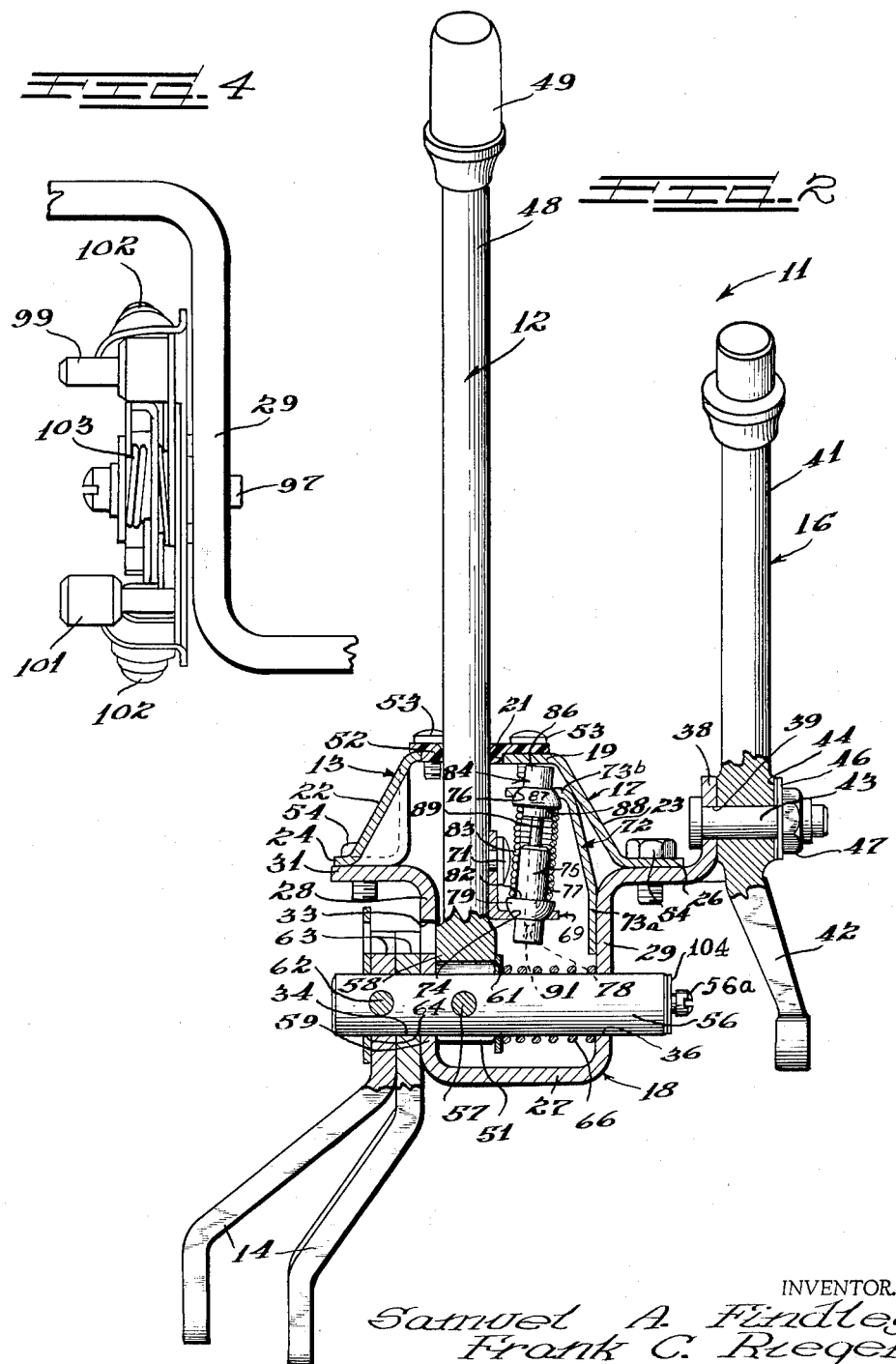

United States Patent Office 3,202,246
Patented Aug. 24, 1965

3,202,246
SELECTOR ASSEMBLY FLOOR SHIFT WITH CLUTCH CONTROL
Samuel A. Findley and Frank C. Rieger, Bronson, Mich., assignors to Kingston Products Corporation, Kokomo, Ind., a corporation of Indiana
Filed May 22, 1963, Ser. No. 282,282
3 Claims. (Cl. 192—3.5)

The present invention relates to a selector assembly for an automatic clutch vehicle wherein a gear selector is operationally connected to a self centering switch the clutch control circuit having an overcenter toggle type spring so that when the vehicle is in gear the lever actuated by the selector is not moved sufficiently to break the clutch control circuit.

In accordance with this invention, a gear selector moves a lever to shift the vehicle transmission into gear and at the same time a positioner actuates a self centering switch regulating a clutch control circuit to engage or disengage the clutch. The switch is particularly characterized by an overcenter toggle spring arrangement so that when the positioner is not actually in driving contact with the switch, the clutch is deneutralized and not operating. Thus, when the selector has been actuated to place the transmission in gear, the positioner does not move sufficiently to break the clutch control circuit.

It is an object of the present invention to provide an improved selector assembly to be useful in conjunction with the control of an automatic clutch vehicle.

It is another object of the present invention to provide a selector assembly utilizing an improved self centering switch means to energize and deenergize a clutch solenoid.

It is further another object of the present invention to provide a selector assembly having means to prevent a gear shift lever from prematurely energizing a clutch solenoid when said gear shift lever is in a desired gear position.

It is still another object of the present invention to provide a selector assembly utilizing an electrical contact switch to energize and deenergize a clutch solenoid and embodying means to prevent the gear shift lever from prematurely energizing the clutch solenoid.

It is further another object of the present invention to provide a selector assembly having a plurality of gear positions associated with a clutch control circuit having a switch with an overcenter unbalancing means which prevents the switch from operating the clutch when the selector assembly is in gear.

Other and further objects of this invention will be apparent to those skilled in the art from the following detailed description of the annexed sheets of drawings which by way of preferred example only illustrates an embodiment of the present invention, and wherein like numerals refer to correspondingly like parts.

On the drawings:

FIGURE 1 is a front elevational view with parts partially in cross-section of the selector assembly of the present invention;

FIGURE 2 is a partial longitudinal cross-sectional view of the selector assembly of the present invention taken along lines II—II of FIGURE 1;

FIGURE 3 is a partial elevational side view of the selector assembly illustrating additive details of the electrical switch means of the present invention utilized to control the clutch control circuit; and FIGURE 4 is a partial side elevational view of the electrical switch mechanism illustrated in FIGURE 3.

As shown on the drawings:

Referring to FIGURES 1 and 2, there is illustrated a selector assembly 11 having a gear shift lever 12, a gear shift housing 13, a pair of gear changing arms 14, and an auxiliary control lever 16.

The gear shift housing 13 is a split housing having a top portion 17 and a lower portion 18. The top portion 17 is an inverted cup-shaped bracket member having a flat horizontal base 19 defining a gear lever pivot passage 21 therethrough. Extending from each side of the base wall 19 are integral diverging side walls 22 and 23 with flanges 24 and 26 extending outwardly respectively therefrom.

The bottom gear shift house portion 18 is a cup-shaped bracket member having a base 27 with substantially vertical sides 28 and 29 extending upwardly therefrom. Extending outwardly from the sides 28 and 29 are flange members 31 and 32, respectively. The side wall 28 has an opening 33 formed therein and the side walls 28 and 29 both respectively have concentrically aligned openings 34 and 36 formed therein. The side wall flange 32 has a horizontal portion 37 extending integrally away from the side wall 29 and an upturned end portion 38 with an opening 39 formed therein. The upturned flange end 38 is utilized to mount the auxiliary lever 16.

The auxiliary lever 16 has a hand actuation portion 41 and a motion translation portion 42. The lever is pivotally mounted to the upturned end by a bolt 43 passing through the port 39 and the auxiliary lever 16. The bolt is fastened by suitable spring washer means 44, washer means 46, and nut means 47.

The gear shift lever 12 has a lever shaft portion 48, an actuator knob portion 49 at one end, and bifurcated clevis fingers 51 formed at its other end. The shaft 48 passes through a closure cap 52 suitably mounted by screws 53 to the inverted base 19 of the top bracket member 17. The bracket members 17 and 18 are fastened at their flanges by suitable bolt means 54. The bracket member 18 has passing through the concentrically aligned openings 34 and 36 formed therein, a cylindrical pivot pin 56 which is longer than the width of the lower housing bracket member 18 and has end portions extending beyond each side wall 28 and 29.

The gear shift clevis fingers 51 are connected to the gear pivot pin 56 by a lock pin 57 passing through the clevis fingers 51.

One side of the bifurcated clevis fingers 51 are separated from the inner surface of the side wall 28 by a washer 59 while the other end of the bifurcated fingers is contacted by a washer 61. A compression spring 66 is coiled around the pivot pin 56 and has one end bottomed against the inner surface of the side wall 29 and the other end abutting the washer 61.

The end of the pivot pin 56 extends through openings in the gear changing arms 14, 14 with one of said arms being disposed against the side wall 28. The outermost arm 14 is shown in FIGURE 2 engaged with the pivot pin 56 by a suitable actuator pin 62. The gear changing arms 14, 14 are slotted so that when the gear shift lever 12 is shifted through the conventional H pattern, the pin 62 will actuatingly engage either one of the arms 14, 14. The outermost arm 14 controls second and third speed forward, while the innermost arm 14 controls first speed forward and reverse. The arms 14, 14 are provided with openings 63 and bracket means 64 which are suitably utilized to place the gear arms in their proper gear changing position. The bores 63 are aligned with the hole 33 and are utilized as a means for placing an aligning pin (not shown) therein. The aligning pin is used to set the gear changing arms in neutral position for assembly into the automobile. The gear changing arm 14 contacting the face of the side wall 28 is utilized to place the transmission gears in first low gear position and in reversing gear position while the other gear arm 14 is utilized to place the transmission in second immediate gear position and third high gear position.

The reversing gear position is obtained by depressing the lever end 49 to push reversing gear shift lever rods 68 downwards and making the proper connection to allow the transmission gears to be placed into reverse.

In accordance with this invention and in order to support an overcenter toggle type spring a first angle bracket 69 has its vertical leg 71a suitably fastened to the shaft 48 slightly above the clevis fingers 51 by means 70. The bracket horizontal leg 71b extends substantially perpendicularly away from the shaft 48 towards the side wall 29. Connected to the inner surface of the side wall 29 is a second angle bracket member 72 having an upwardly extending leg 73a extending towards the top housing base 19 and having a horizontal leg 73b extending towards the side wall 28 and substantially perpendicularly to the shaft 48. The second bracket leg 73b is within the top gear housing portion 17 while the bracket leg 71b is in the lower gear house portion 18. The bracket legs 71b and 73b face one another and both have formed therein openings 74 and 76, respectively, having rounded or tapered edges forming a socket. Inserted into the opening, or socket 74 is a ball means 75 having a cylindrical body portion 77 and a cylindrical passage 78 therethrough. The cylindrical body 77 has integrated therewith a ball 79 shaped to pivotally engage a corresponding socket of the adjoining opening 74. An enlarged end wall 82 faces the flange leg 73b and bottoms a coil spring 83 around the cylindrical body 77 which extends upwards towards the flange leg 73b.

A ball means 84 having a cylindrical body portion 86 and a ball form pivot member 87 bottoms the other end of the spring 83 against an end wall 88 facing the flange leg 71b. Extending from one end of the cylindrical body 86 is a pin member 89 having an abutment end 91. The diameter of the pin member is slightly smaller than the diameter of the passage 78 and the length of the pin member 89 is sufficient to extend a substantial distance within the passage 78.

It is contemplated by the present invention that the angle brackets 69 and 72, the spring 83, the female pivoting means, and the male pivoting means function as an overcenter unbalancing means. Thus, when the parts are centered in common alignment, the spring 83 is compressed to store energy which is used to bias the lever in direction when moved out of center alignment.

In operation, therefore, when the gear shift lever 12 is placed in a selected gear position, the bracket member 69 moves with the lever 12 and one end of the spring axis prescribed by the ball means 75 is shifted with respect to the opposite end of the spring axis which remains stationary as prescribed by the ball means 84 carried on the bracket 72. Herein the spring 83 exerts a biasing force tending to retain the lever 12 in its off-center position and thereby insuring that when the car is in gear, the lever or positioner 12 does not move sufficiently to break the clutch control circuit.

Referring to FIGURES 3 and 4, there is shown the solenoid contact switch which is connected to the wall 29 by suitable fastening means. The contact switch has a first stationary contact portion 92 with an electrical contact 93 fastened thereto and a movable Y-shaped electrical contact 94 with a second movable contact portion 96 connected thereto. The movable contact 94 is pivotally mounted on the housing wall 28 by suitable pivot pin means 97 and has an electrical contact 96 connected to the end of the main leg 94a thereof. The fingers 94b and 94c of the Y each have an actuator leg 99 and 101 extending therefrom near the ends thereof. Connected to the pivot mounting 97 and actuator fingers 94b and 94c by suitable mounting means 102 is a spring 103. The spring 103 is connected to self-center the clutch solenoid switch so that the movable contact 94 will return to its center contact position automatically, as illustrated in FIGURE 3.

Connected to the end of the gear pivot pin 56 extending beyond the wall 29 by a suitable screw fastener 56a is an actuator positioner 104. The actuator positioner has a leg 106 which extends between the clutch solenoid switch actuator legs 99 and 101. The positioner leg 106 moves in unison with the pivot pin 56 and the movement of the gear shift lever 12. When the positioner leg 106 contacts either of the actuator legs 94b or 94c it pivots the movable contact 94 in a direction to break electrical contact between the first and second contacts 96. It will be noted (FIGURE 4) that the actuator legs 99 and 101 have different cam surface configurations. Thus, when the gear shift lever 12 is shifted through the conventional H pattern, the pin 56 is shifted axially, thereby positioning the leg 106 to pick up or engage a cam surface on either the leg 99 or the leg 101 corresponding to a corresponding speed or reverse position.

The size and spacing of the actuator legs 94b and 94c, the size of the actuator positioner 106 and the space between the actuator positioner 106 and the actuator legs 94b and 94c, and the respective widths of the first and second electrical contact 92 and 96 are predetermined so that when the gear shift selector is moved, the lever shifts the transmission into gear, and at the same time the positioner moves and contacts a point to engage or disengage the clutch through the electrical switch. While the car is in gear the positioner does not move sufficiently to break the clutch control circuit because of the overcenter spring 83 and because the electrical switch is self centering, the clutch is deneutralized when the positioner is out of contact. While the clutch could be engaged with the switch in either open or closed position, the exemplary embodiment herein illustrates the switch arrangement for having the solenoid disengage the clutch.

Although various minor modifications might be suggested by those versed in the art, it should be understood that we wish to embody within the scope of the patent warranted hereon, all such embodiments as recently and properly come within the scope of our contribution to the art.

We claim as our invention:

1. A gear selector assembly for an automotive transmission comprising
    a gear selector lever having a bifurcated end,
    a pin movable axially and angularly having a driven connection with said selector lever at said bifurcated end,
        thereby to support said selector lever for pivotal movement,
    a pair of gear changing arms selectively engageable in driven connection with said pin upon actuation of said selector lever,
    a positioner member connected to the end of said pin and having an actuator leg movable in unison with said pin both axially and angularly,
    self-centering spring-biased switch means for controlling a solenoid-operated clutch control circuit and having a lever assembly engageable with said actuator leg to operate said switch means in correlation with actuation of said selector lever,
    and over-center toggle spring means operatively biasing said selector lever,
    whereby when the selector lever has been actuated to place the transmission in gear the positioner member does not move sufficiently to break the clutch control circuit.

2. A gear selector assembly for an automotive transmission comprising
    a selector lever,
    a housing having a pivot pin connected to said selector lever and supporting said lever for pivotal movement, said housing having means supporting said pivot pin for rotation and for sliding axial movement, whereby said selector lever may be selectively moved through an H pattern shifting sequence for three speeds forward and reverse, a pair of gear changing arms selectively engageable in driven engagement with said pivot pin upon actuation of said selector lever, a first bracket on said lever and movable therewith, a second bracket on said housing, each of said first and second brackets having a socket, a ball member in each said socket, an extensible spring bottomed against said sockets, said spring having a spring axis centered when said lever and said brackets are in common alignment, a positioner member connected to the end of said pivot pin and having an actuator leg movable in unison with said pivot pin both axially and angularly, self-centering switch means for controlling a solenoid-operated clutch control circuit and having a lever assembly engageable with said actuator leg to operate said switch means in correlation with actuation of said selector lever, whereby said spring will hold said selector lever in position so it will not move sufficiently to inadvertently break the clutch control circuit.

3. A gear selector assembly as defined in claim 2 wherein said lever assembly of said self-centering switch means includes variable cam surfaces engageable with said actuator leg at a corresponding forward speed or reverse positions of the selector lever.

References Cited by the Examiner

UNITED STATES PATENTS 1,416,479  5/22  Lamb.
2,019,073  10/35  Cooper et al.

FOREIGN PATENTS 1,129,093  1/57  France.
516,730  1/40  Great Britain.

DAVID J. WILLIAMOWSKY, *Primary Examiner.*